UNITED STATES PATENT OFFICE.

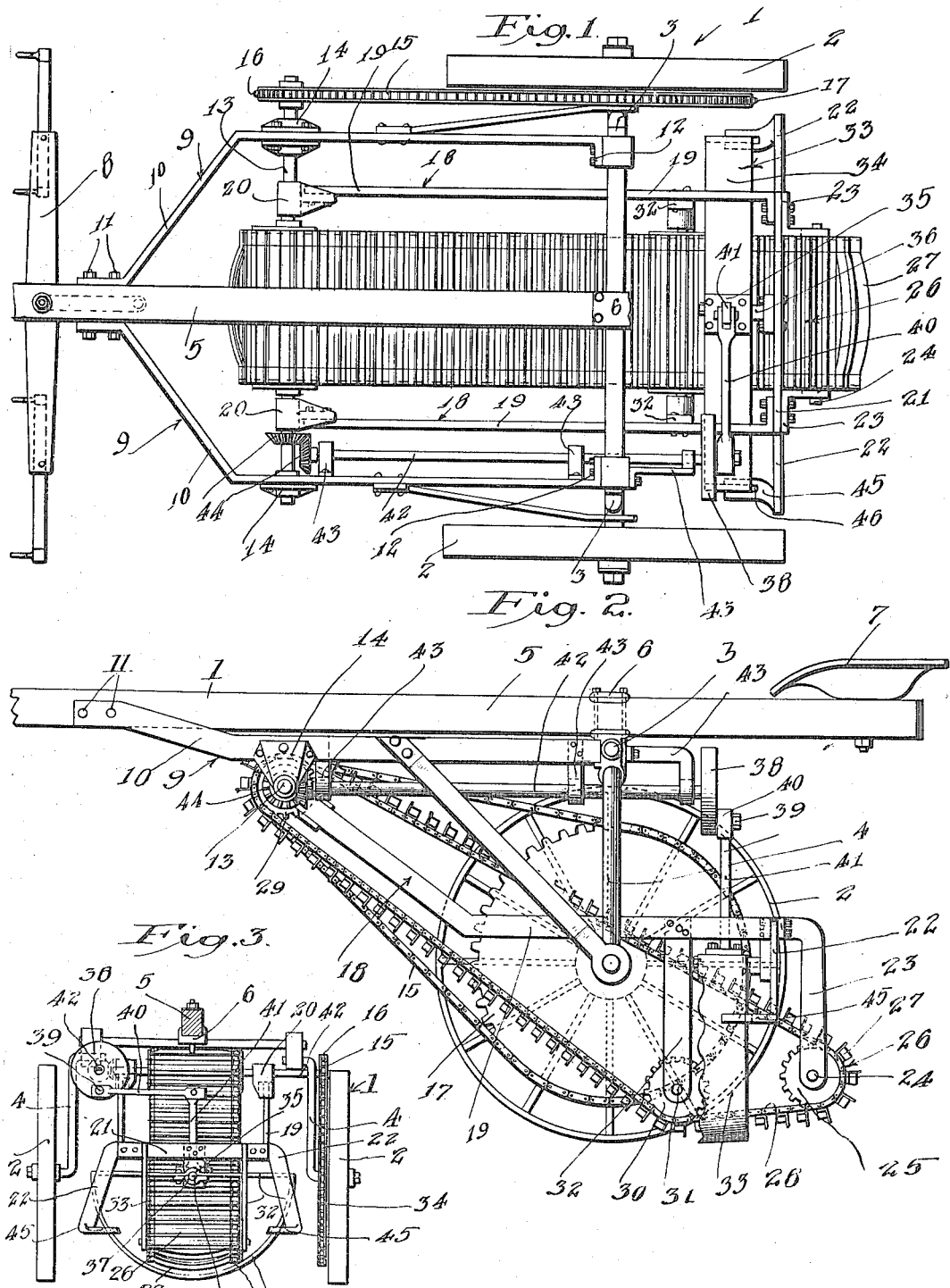

WILLIAM R. GARDNER, OF LOS ANGELES, CALIFORNIA, ASSIGNOR TO AMERICAN BEET TOPPER COMPANY, OF LOS ANGELES, CALIFORNIA, A CORPORATION OF CALIFORNIA.

BEET-TOPPER.

1,135,173.  Specification of Letters Patent.  Patented Apr. 13, 1915.

Application filed November 21, 1914. Serial No. 873,397.

*To all whom it may concern:*

Be it known that I, WILLIAM R. GARDNER, a citizen of the United States, residing at Los Angeles, in the county of Los Angeles and State of California, have invented a new and useful Beet-Topper, of which the following is a specification.

This invention comprehends improvements in beet topping machines and relates more particularly to improved cutting means therefor.

One of the objects of the invention is to provide a beet topper having a wheeled truck provided with a pivoted or swinging frame which supports an endless caterpillar belt in such position that it will, when the machine is in operation, move along the ground in contact therewith to engage the beet tops and steady the beets and force them rearwardly against an oscillating semicircular cutter which works across the belt under its lower lead.

This machine is constructed so as to remove or sever the beet tops while the beets are in the ground, and because of its faculty for automatically adjusting itself to unevenness in the surface, it may be used in any field. The machine will also operate to cut the tops regardless of the distance they extend above the ground.

With these and other objects in view, the invention consists of certain novel features of construction, combination and arrangement of parts as will be hereinafter fully described, illustrated and claimed.

Figure 1 is a plan view of the preferred embodiment of my beet topper. Fig. 2 is a side elevation thereof with the near wheel removed. Fig. 3 is a rear elevation.

Referring in detail to the drawings by numerals, 1 designates as an entirety a wheeled truck having wheels 2 mounted on an axle 3, said axle having depending end portions 4 on which are formed the wheel spindles. A pole 5 extends longitudinally of the machine above the axle and is suitably connected thereto, as indicated at 6. This pole carries adjacent its rear end a driver's seat 7, and has secured to its forward end a suitable draft appliance 8. A stationary frame 9 is provided having side bars 10 which are connected at their forward ends to the pole 5 by means of suitable fasteners 11, and which are connected at their rear ends by suitable fasteners 12 to the axle 3.

A shaft 13 extends transversely under the frame 9, and is connected thereto by bearings or hangers 14. This shaft is driven by a sprocket chain 15 running over sprockets 16 and 17 carried by the shaft 13 and one of the wheels 2 respectively.

A swinging frame 18 is provided for the purpose of supporting the cutter and the caterpillar belt, to be later described. This frame comprises a pair of parallel side bars 19 having relatively substantially horizontal rear portions and upwardly inclined front portions which latter are connected at their terminals to couplings 20 loosely mounted on the shaft 13. The rear ends of the side bars 19 are bolted or otherwise secured to a cross bar or end bar 21, and this bar 21 is formed at its terminals with integral depending guide arms 22. The shaft 13 may be considered as forming the forward cross bar of this frame. A pair of depending hangers 23 are bolted or otherwise secured to the bar 21 adjacent its ends and carry a shaft 24, to which is secured a pair of sprocket wheels 25. A caterpillar belt 26 having cross angle-iron flights 27 and side chains 28 runs over the sprockets 25 and around sprockets 29 rigid on the shaft 13. The direction of the lower lead of the belt is changed at its point of contact with the ground by a pair of idle sprockets 30 carried by a shaft 31 which latter is in turn supported by a pair of hangers 32 connected at their upper ends to the side bars 19 of the frame 18.

For the purpose of severing the beet tops from the roots, I provide a semicircular cutter 33 preferably formed of flat metal having its forward edge sharpened and scalloped. The cutter is formed integrally with a flat top bar 34 extending between the ends of the cutter, and this top bar is arched intermediate its ends as at 35 to form a bearing which rests upon a stub shaft 36 carried by and projecting forwardly from the end frame bar 21. The bearing portion 35 is held in engagement with the stub shaft 36 by a plate 37 best shown in Fig. 3.

In order that the knife or cutter shall operate efficiently it is necessary to impart to it a swinging or oscillating movement, and I provide for this movement by a simple crank motion. The preferred means for operating the cutter consists of a disk 38 carrying an eccentric pin 39 to which is connected one end of the pitman or connecting rod 40 and the other end of this connecting rod is pivotally secured to an upstanding arm 41 connected to the cutter cross bar 34. The disk is rotated by a shaft 42 supported in bearings 43 and driven by beveled gears 44, one of said gears being rigidly secured to the rotatable shaft 13.

In order to steady the cutter, I have provided substantially horizontal forwardly extending lips or guides 45 which are slotted, as indicated at 46, to provide forks which pass on opposite sides of the blade 33, as clearly shown.

As the machine is driven over a field, the caterpillar belt is supported at its rear end by engaging the ground, and this belt is preferably driven so as to move rearwardly at a greater speed than the machine moves forwardly. This being the case, the flights 27 of the belt coming in contact with the beets will force them rearwardly toward the cutter, and this cutter, which is oscillated by the crank motion, will easily sever the tops from the roots. Since the frame 18 is pivotally connected at its forward end to the shaft 13, its rear portion may move freely in a vertical plane, and its weight will hold the belt and cutter always in contact with the ground. The sprocket 17 turns with one of the wheels 2 and imparts a movement to the belt 15 which in turn rotates the shaft 13, and this shaft drives the belt, and also the cutter through the means heretofore described.

While I have shown and described the preferred embodiment of my invention, it will be understood that I do not wish to be limited to this exact construction, but may make such changes as will fall within the scope and spirit of the invention as claimed.

What I claim is:

1. In a beet topper, an arcuate cutter having its axis in a substantially horizontal plane, means for oscillating said cutter, and means passing across the cutter to force the beet tops thereagainst.

2. In a beet topper, an arcuate cutting blade having its axis in a substantially horizontal plane, means for oscillating the cutter as the topper moves forwardly, and an endless belt traveling across the cutter blade to force the beet tops thereagainst.

3. A beet topper including a wheeled truck, a frame pivotally connected at one end to said truck, an endless belt carried by the frame having its lower lead movable rearwardly and contacting at one point with the ground, an arcuate blade extending under the lower lead of the belt to the rear of the point of contact with the ground, and means for oscillating said blade.

4. A beet topper comprising a wheeled truck, a frame pivotally supported at one end by said truck, an endless belt, means carried by the frame to support the belt, said belt having a point of contact with the ground, a semicircular knife blade passing under the belt to the rear of its point of contact with the gronud, and wheels for driving the belt and oscillating the belt.

In testimony whereof, I have hereunto set my hand at Los Angeles, Cal., this 16th day of November, 1914.

WILLIAM R. GARDNER.

In presence of—
  RODNEY M. SMITH,
  GEORGE W. HAINES.